March 17, 1936.   C. C. FARMER   2,034,288
FLUID PRESSURE BRAKE
Original Filed Dec. 10, 1930   2 Sheets-Sheet 1
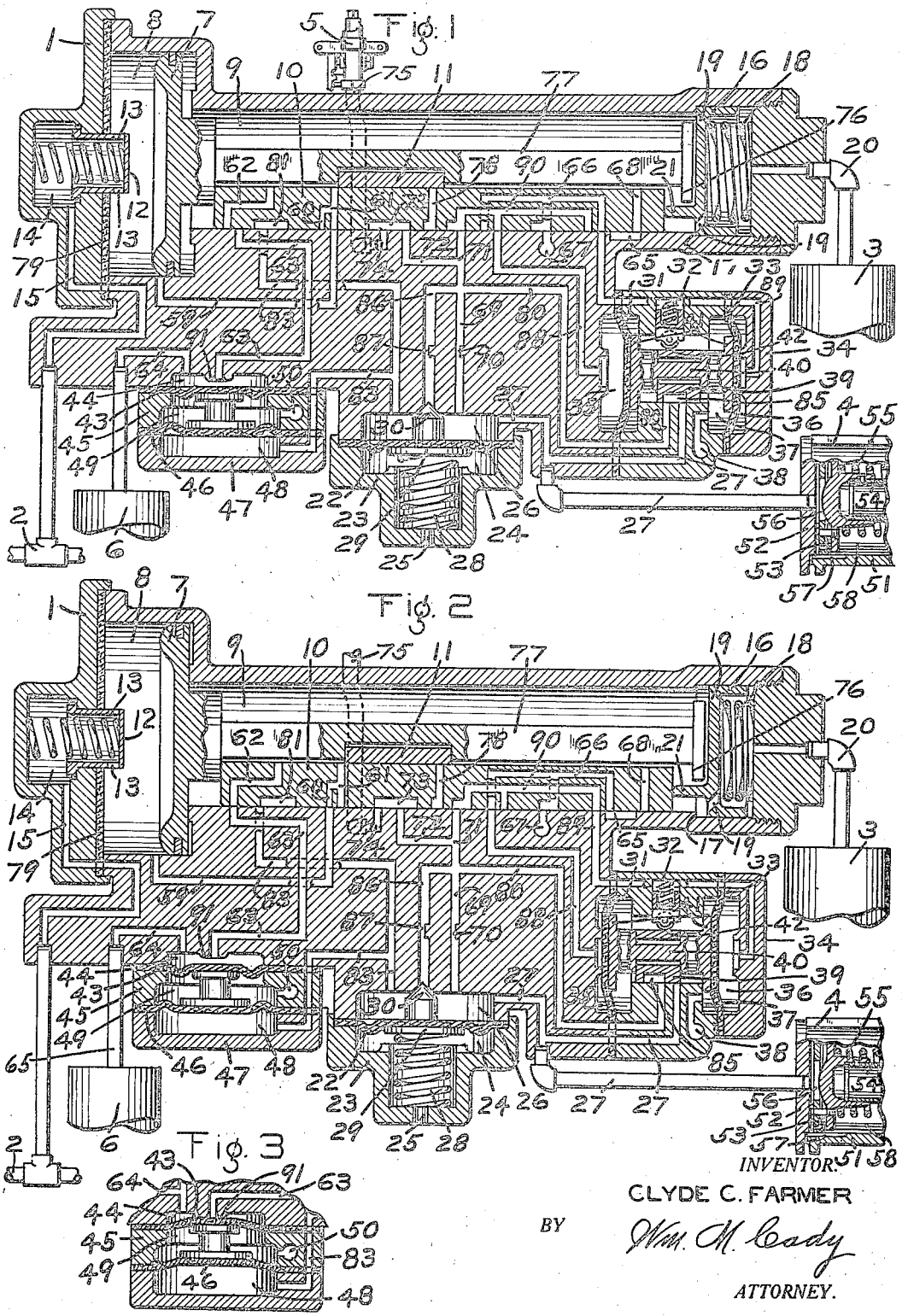
INVENTOR
CLYDE C. FARMER
BY Wm. M. Cady
ATTORNEY.

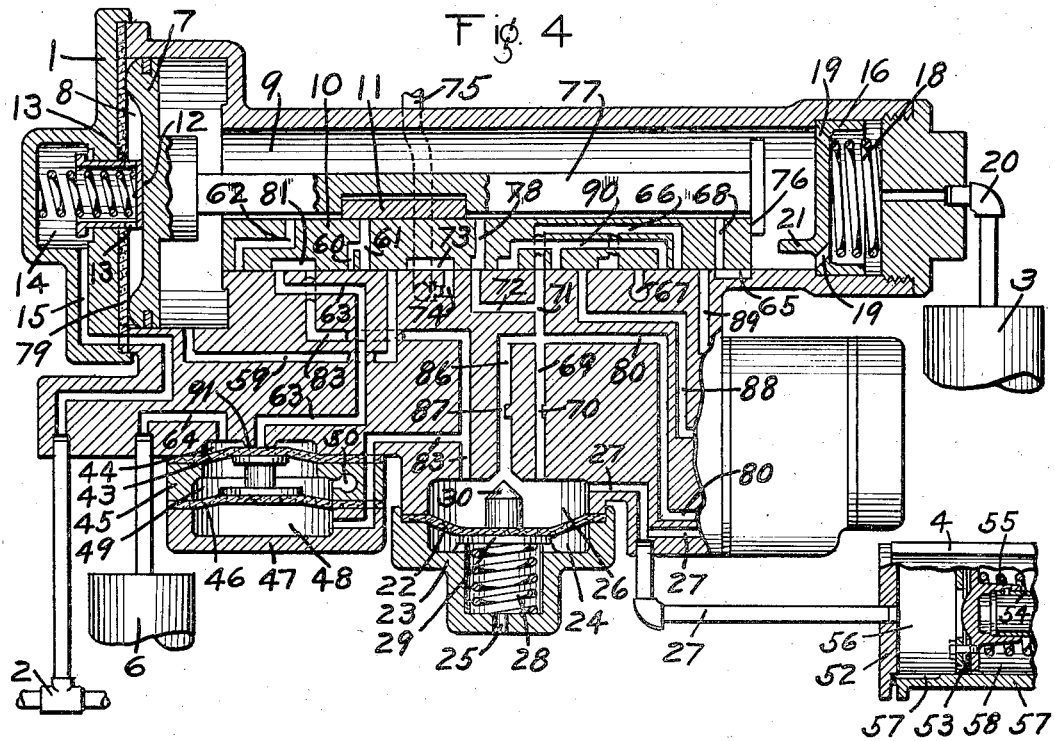

Patented Mar. 17, 1936

2,034,288

UNITED STATES PATENT OFFICE 2,034,288

FLUID PRESSURE BRAKE

Clyde C. Farmer, Pittsburgh, Pa., assignor to The Westinghouse Air Brake Company, Wilmerding, Pa., a corporation of Pennsylvania Application December 10, 1930, Serial No. 501,412
Renewed December 18, 1935

22 Claims. (Cl. 303—35)

This invention relates to fluid pressure brakes and more particularly to the type adapted to operate in accordance with variations in brake pipe pressure.

In a train equipped with the usual fluid pressure brake equipment, the brakes apply serially from the front end of the train to the rear end of the train because the reduction in brake pipe pressure caused by operation of the engineer's brake valve is effective first on cars at the head end of the train. On account of this, the cars toward the rear end of the train tend to run in on those toward the front end of the train, which occasionally results in damage or a wreck.

One object of my invention is to delay or slow down the application of the brakes at the head end of the train, so that the brakes on cars at the rear end of the train will be applied more nearly in synchronism with the brakes on the cars at the head end of the train, and thereby obviate the above undesirable action.

In the usual brake cylinder, a leakage groove is provided for connecting the chambers at the opposite sides of the brake cylinder piston when in release position. This groove permits escape of fluid which may leak to the pressure side of the piston, so as to prevent an undesired application of the brakes or dragging of brake shoes on the car wheels. In carrying out my invention, I restrict the flow of fluid to the brake cylinder on cars in the front portion of the train. This restricted flow of fluid to the brake cylinder, however, would tend to escape through the brake cylinder leakage groove, and it is another object of my invention to provide a sudden, but limited inshot of fluid to the brake cylinder on cars in the front portion of the train upon effecting an application of the brakes so as to ensure movement of the brake cylinder piston over the leakage groove and thus prevent an undesirable loss of fluid through said groove and at the same time ensure the brakes being applied by the restricted flow of fluid to the brake cylinder.

In handling a train down a grade, it is a general practice to turn up the usual retaining valves so as to hold a predetermined pressure in the brake cylinders while recharging the brake equipments on the train for effecting another application of the brakes, this alternate applying the brakes and recharging the brake equipment being commonly termed "cycling". After the initial application of the brakes in cycling, it is unnecessary to provide the sudden inshot of fluid to the brake cylinder at the front portion of the train for the reason that the brake cylinder pistons are held out past the leakage groove by the pressure retained by the retaining valve.

Another object of my invention is to provide an improved brake equipment having means for effecting a sudden inshot of fluid to the brake cylinder at the front portion of the train upon effecting the initial application of brakes in cycling, and other means for rendering the inshot means inoperative after the initial application of the brakes in cycling.

Other objects and advantages will appear in the following more detailed description of my invention.

In the accompanying drawings; Fig. 1 is a diagrammatic view, mainly in section, of a fluid pressure brake equipment embodying my invention; Fig. 2 is a diagrammatic view, mainly in section, of the equipment shown in Fig. 1, but in a different position; Fig. 3 is a diagrammatic view of a portion of the equipment shown in Fig. 2; and Fig. 4 is a diagrammatic view, mainly in section, of the equipment shown in Fig. 1, but in another position.

As shown in the drawings, the fluid pressure brake equipment comprises a valve device 1 connected to a brake pipe 2, an auxiliary reservoir 3, a brake cylinder 4, a retaining valve 5, and an inshot reservoir 6.

The valve device 1 comprises a control valve portion, a delay valve portion, a selector valve portion, and an inshot suppression portion, all of said portions being preferably associated with each other as shown in the drawings.

The control valve portion of the valve device 1 comprises a casing containing a piston 7 having at one side a chamber 8 and at the other side a chamber 9 containing a main slide valve 10 and an auxiliary slide valve 11 adapted to be operated by said piston. Extending into the chamber 8 is a spring-pressed stop 12 having ports 13 connecting chamber 8 to chamber 14 which is connected by passage 15 to the brake pipe 2. Disposed in the right hand end of the valve chamber 9 is the usual retarded release device comprising a movable abutment 16 adapted to be pressed into engagement with a shoulder 17 in the casing by a spring 18 and having ports 19 for connecting said valve chamber to passage and pipe 20 leading to the auxiliary reservoir 3. Projecting from the abutment 16 is a finger 21 adapted to be engaged by the main slide valve 10.

The delay valve portion of the valve device 1 comprises a flexible diaphragm 22 clamped between the casing and a cover plate 23 and having at one side a chamber 24 connected to the atmosphere through a port 25, and at the opposite side a chamber 26 connected to the brake cylinder 4 through a passage and pipe 27. The chamber 24 contains a spring 28 acting on a thrust plate 29 engaging said diaphragm for urging a valve 30, contained in chamber 26, to its seat.

The selector valve portion of the valve device 1 comprises a flexible diaphragm 31 clamped between the casing and a spacer section 32, and a flexible diaphragm 33 clamped between the section 32 and a cover plate 34. The diaphragm 31 has at one side a chamber 35, the diaphragm 33 has at one side a chamber 36, and intermediate said diaphragms is a chamber 37 connected to the atmosphere through a port 38 and containing a slide valve 39 having operating engagement in a stem 40. The stem 40 is provided at each end with an enlarged follower portion 41 engaging the diaphragms 31 and 33, so that deflection of said diaphragms is adapted to move the slide valve 39, which is held seated by the pressure of a spring-pressed roller 42.

The inshot suppression portion of the valve device 1 comprises a flexible diaphragm 43 having at one side a chamber 44 and clamped between the casing and a spacer section 45, and a flexible diaphragm 46 of greater area than diaphragm 43 and clamped between the section 45 and a cover plate 47. The diaphragm 46 has at one side a chamber 48 and intermediate said diaphragms is formed a chamber 49 which is open to the atmosphere through a port 50.

The brake cylinder 4 is of the usual type comprising a cylinder 51, a pressure head 52 closing one end of said cylinder and a piston 53 slidably mounted in said cylinder and provided with a piston rod 54 through which the car brakes are applied. A return spring 55 is provided for moving the piston 53 to release position, as shown in Fig. 1 of the drawings, when fluid is vented from chamber 56 at the pressure side of said piston. In the release position, a leakage groove 57 connects the chamber 56 to the chamber 58 which is at all times open to the atmosphere, as is well understood.

In operation, to initially charge the equipment, fluid under pressure is supplied to brake pipe 2 in the usual manner and flows therefrom through passage 15, chamber 14 and ports 13 in the stop 12 to the piston chamber 8 of the control valve portion of the valve device 1.

In supplying fluid to the brake pipe 2, it is customary to move the brake valve device (not shown) to the usual release position to supply fluid, at a rapid rate and at a pressure higher than normally carried, to the brake pipe, so as to obtain a pressure build up at the rear end of the train as quickly as possible. This high pressure is permitted to flow to the brake pipe until the brake equipments at the front end of the train become nearly charged to the normal pressure carried in the brake pipe and then the brake valve device is moved to the usual running position in which the pressure of fluid supplied to the brake pipe is governed by the usual feed valve device (not shown). Upon moving the brake valve device to running position and thus cutting off the supply of fluid at high pressure to the brake pipe 2, the pressure of fluid at the front end of the train reduces to that supplied by the feed valve device, due to the continued flow towards the rear end of the train and the tendency to equalize in the brake pipe.

In charging the brake pipe, as above described, the high brake pipe pressure is obtained only in the front portion of the train and gradually reduces as the rear portion of the train is approached. As a result, the control valve piston 7 and slide valves 10 and 11 at the front end of the train are shifted to a retarded recharge position in which the movable abutment 16 is shifted, compressing spring 18, as shown in Fig. 2 of the drawings, whereas in the rear portion of the train where the brake pipe pressure is not increased so rapidly, said piston and slide valves are shifted to the full release position, as shown in Fig. 1 of the drawings.

In retarded recharge position of the control valve piston 7 and slide valves 10 and 11, fluid flows from piston chamber 8, through passage 59, a port 60 of small flow area in the main slide valve 10, and a port 61 to the valve chamber 9, the port 61 being uncovered by the auxiliary slide valve 11. From chamber 9, fluid flows through ports 19 in the movable abutment 16 and passage and pipe 20 to the auxiliary reservoir 3 and at the same time fluid flows from valve chamber 9 through port 62 in the main slide valve and passage 63 to chamber 44 in the inshot suppression portion of the valve device 1, and from said chamber through passage 64 and pipe 65 to the inshot reservoir 6. In this manner the auxiliary reservoir 3 and inshot reservoir 6 are charged to brake pipe pressure at a rate governed by the small flow area of port 60 when the brake pipe pressure is increased at a rapid rate. For a reason to be hereinafter explained, it is desirable to prevent the pressure of spring 18 from shifting the abutment 16 and moving the piston 7 and slide valves 10 and 11 from the retarded recharged position to the full release position when the auxiliary reservoir pressure in valve chamber 9 becomes substantially equal to the brake pipe pressure in piston chamber 8 and in order to prevent such from occurring, a cavity 65 is provided in the slide valve seat which is opened to the atmosphere in the retarded recharge position through port 66 in the main slide valve and atmospheric passage 67. By thus exposing a portion of the slide valve to atmospheric pressure, the resistance of said slide valve to movement is increased sufficient to offset the value of the spring 18.

On cars at the rear of the train where the control valve piston and slide valves 10 and 11 are only moved to full release position, as shown in Fig. 1 of the drawings, port 61 in the main slide valve 10 registers with passage 59 from the piston chamber 8. Port 61 has a greater flow area than port 60, so as to permit a more rapid rate of flow of fluid from the piston chamber 8 to the valve chamber 9 and from thence to the auxiliary reservoir 3. Passage 63 is lapped by the slide valve 10 so as to prevent flow of fluid to the inshot reservoir 6, and the loading cavity 65 in the slide valve seat is connected through port 68 in the main slide valve 10 to valve chamber 9, so that auxiliary reservoir pressure is permitted to act in said cavity and render it ineffective to increase the resistance to movement of the main slide valve.

In both retarded recharge position and full release position of the valve device 1, the pressure chamber 56 in the brake cylinder 4 is opened to the atmosphere through pipe and passage 27, chamber 26, a passage 69 having a restricted portion 70, passages 71 and 72, cavity 73 in the main slide valve 10, passage 74, pipe 75 and retaining valve device 5 which, when in the normal position, effects a direct connection from pipe 75 to the atmosphere. With chamber 26 of the delay valve portion open to the atmosphere, spring 28 acting on diaphragm 22 holds valve 30 seated.

In releasing the brakes after an application, the selector slide valve 39 is shifted to a retarded application position when the control valve device is moved to retarded recharge position and to a cutout position when the control valve device is moved to the full release position in order to control the supply of fluid to the brake cylinder 4 in accordance with the location of the brake equipment in the train when an application of the brakes is effected in the manner which will hereinafter be more fully described.

The adjustment of the selector portion slide valve 39 so as to retard the rate of applying the brakes on cars at the head end of the train is effected in releasing the brakes after the brakes have been applied, and is brought about in the following manner. As hereinbefore described in connection with charging the brake equipment, the control valve piston 7 and slide valves 10 and 11 are shifted to retarded recharge position in the front portion of the train and to full release position on cars in the rear portion of the train. In the retarded recharge position, diaphragm chamber 35 of the selector valve portion is opened to the atmosphere through passage 88, port 66 in the main slide valve 10 and atmospheric passage 67. Diaphragm chamber 36, however, is connected to the brake cylinder passage 71 through passage 89 and port 90 in the main slide valve, so that in releasing, fluid at brake cylinder pressure is permitted to flow to chamber 36 and act on diaphragm 33, which is deflected and moves the slide valve 39 to its left hand or retarded application position in which the passages 80 and 27 are disconnected. The actuating fluid in diaphragm chamber 36 is vented with fluid from the brake cylinder, but when the pressure in said chamber is reduced to atmospheric pressure upon a complete release of the brakes, the resistance to movement of the slide valve 39, which is subject to the pressure of the spring-pressed roller 42, maintains the slide valve 39 and diaphragms 31 and 33 in the position to which they were moved.

In the full release position, diaphragm chamber 36 of the selector valve portion is open to the atmosphere through passage 89, port 66 in the main slide valve 10 and atmospheric passage 67 and diaphragm chamber 35 is connected to the brake cylinder passage 71 through passage 88 and port 90 in the main slide valve 10. Thus, brake cylinder pressure acts in diaphragm chamber 35 to shift the selector valve to the cut-out position in which passages 80 and 27 are connected, and the selector valve remains in this position upon a complete venting of fluid from the brake cylinder and from the diaphragm chamber 35 on account of the resistance to movement of the slide valve 39.

To effect an application of the brakes, the brake pipe pressure is reduced in the usual manner and causes a corresponding reduction to occur in piston chamber 8 of the control valve device on account of the connection through ports 13 in the stop 12, chamber 14 and passage and pipe 15 to brake pipe 2. When the brake pipe pressure in piston chamber 8 is thus reduced a predetermined amount, the auxiliary reservoir pressure in valve chamber 9 shifts the piston 7 and auxiliary slide valve 11 toward the left hand until the shoulder 76 on the piston stem 77 engages the end of the main slide valve. In this position of the auxiliary slide valve 11, the charging port 61 is lapped so as to prevent back flow from the auxiliary reservoir 4 and valve chamber 9 to the brake pipe and the brake application port 78 is uncovered. A further reduction in brake pipe pressure and in the pressure in piston chamber 8 permits the auxiliary reservoir pressure in valve chamber 9 to move the piston 7 and slide valves 10 and 11 to the brake application position as shown in Fig. 4 of the drawings, and in which the piston 7 engages the gasket 79.

In the brake application position of the control valve piston and slide valves, the brake application port 78 registers with passage 72, which permits fluid to flow from the auxiliary reservoir through valve chamber 9, port 78, and passages 72 and 71 to passage 69 and to passage 80 leading to the seat of the selector slide valve 39. In the front portion of the train, the selector slide valve is in the position shown in Fig. 2 of the drawings in which passage 80 is lapped, and with the delay valve 30 seated, fluid is permitted to flow from passage 69 to the delay valve chamber 26 at a rate governed by the capacity of the restricted portion 70 of passage 69. From chamber 26, fluid flows through passage and pipe 27 to the brake cylinder 4.

The flow capacity of the restricted portion 70 in passage 69 is such that the flow capacity of the leakage groove 57 in the brake cylinder 4 would vent fluid from the brake cylinder piston chamber 56 at a rate which would prevent the brake cylinder piston 53 from moving out to apply the brakes; however, according to my invention, I provide a sudden but predetermined inshot of fluid to chamber 56 to move the piston 53 past the leakage groove 57, so that the restricted flow of fluid through passage 69 to the brake cylinder is effective. As hereinbefore described, the inshot reservoir 6 is charged with fluid at brake pipe pressure when the control valve device is in retarded recharge position. When the control valve device moves to brake application position, a cavity 81 in the main slide valve 10 connects passage 63 to a passage 83 which permits fluid to flow from the inshot reservoir 6 through pipe and passage 64, diaphragm chamber 44 of the inshot suppression portion, passage 63, cavity 81, and passage 83 to the delay valve chamber 26, and from thence through passage and pipe 27 to the brake cylinder chamber 56. This flow of fluid from the inshot reservoir 6 to the brake cylinder piston chamber 56 is rapid but need only be sufficient to ensure movement of the brake cylinder piston 53 past the leakage groove 57, after which the supply of fluid to said chamber is governed by the flow through the restricted portion 70 of passage 69.

At the rear end of the train, where the control valve device moves only to full release position in charging the brake equipment, and the selector valve slide valve 39 is in the position shown in Fig. 1 of the drawings, when the control valve device moves to brake application position upon a reduction in brake pipe pressure, fluid supplied from the auxiliary reservoir through port 78 in the main slide valve 10 to passage 72, flows through passages 71 and 80, cavity 85 in the selector slide valve 39 and passage and pipe 27 to the brake cylinder piston chamber 56. At the same time, fluid flows from passage 71 through the restricted portion 70 in passage 69, chamber 26 and to passage and pipe 27 leading to the brake cylinder. This flow of fluid to the brake cylinder is at a service rate and may be governed by the flow area through the brake application port 78 and is so much in excess of the venting capacity of the leakage groove 57 in the brake cylinder, that the brake cylinder piston 53 is promptly moved to apply the brakes without the aid of a sudden inshot from reservoir 6 as is necessary at the front portion of the train. As hereinbefore described, the inshot reservoir is not charged when the control valve device is in full release position, so that upon its movement to brake application position, there is no flow of fluid therefrom to the brake cylinder as occurs at the front portion of the train.

The delay valve diaphragm 22 is subject to fluid at brake cylinder pressure in chamber 26 and when the brake cylinder pressure is built up to a predetermined degree, the diaphragm is deflected downwardly against the pressure of spring 28 and pulls the valve 30 away from its seat, which permits an increased flow of fluid from passage 71 to the brake cylinder at the front portion of the train, by way of passage 86 containing the restricted portion 87. The unseating of the delay valve 30 at the rear portion of the train does not have any effect however, since the selector slide valve 39 is in such a position as to form a by-pass around the choked portions 70 and 87 of passages 69 and 86, respectively.

It will be noted that, according to my invention, the rate of supply of fluid to the brake cylinder 4 at the front portion of the train is at first restricted by the flow area of the choked portion 70 of passage 69, but upon obtaining a predetermined pressure in the brake cylinder, the rate is increased by the flow area of the restricted portion 87 in passage 86, whereas at the rear portion of the train fluid is supplied to the brake cylinder at a relatively fast rate. The restricting of the supply of fluid to the brake cylinder at the front end of the train is adapted to provide the necessary time interval to permit or ensure movement of the brake control pistons 7 of the cars at the rear end of the train to their application positions and therefore permits the brakes at both the front and rear ends of the train to apply more nearly in synchronism. It will further be noted, as hereinbefore described, that the fluid supplied to brake cylinder 4 from the inshot reservoir 6 is not adapted to produce effective braking power, but is merely an expedient for moving the brake cylinder piston 53 past the leakage groove 57.

To release the brakes after an application, fluid under pressure is supplied to the brake pipe 2 and flows therefrom to the piston chamber 8 of the control valve device. Upon an increase in pressure in said chamber over the reduced auxiliary reservoir pressure in the valve chamber 9, the control piston 7 and slide valves 10 and 11 are shifted to either retarded recharge position, as shown in Fig. 2 of the drawings, or to full release position, as shown in Fig. 1 of the drawings, in accordance with the position of the device in the train, and consequently the rate of increase in brake pipe pressure to which the control piston 7 is subjected. In the retarded release position, the auxiliary reservoir 3 and inshot reservoir 6 are recharged with fluid under pressure and in the full release position, only the auxiliary reservoir is recharged with fluid under pressure, in the same manner as hereinbefore described. In either position of the control valve device, the brake cylinder 4 is opened to the atmosphere through pipe and passage 27, passages 69, 71 and 72, cavity 73 in the main slide valve, passage 74, pipe 75 and retaining valve device 5, thereby permitting fluid to be vented from the brake cylinder to effect a release of the brakes.

As long as the delay valve 30 is unseated, fluid also flows from the brake cylinder through passage 86 to passage 72, but when the brake cylinder pressure is reduced to a predetermined low degree, spring 28 seats valve 30, but fluid continues to vent from the brake cylinder in the manner above described.

In releasing the brakes as just described, the valve 39 of the selector portion is operated by brake cylinder pressure to a position corresponding to its position in the train, as hereinbefore fully described.

It will be noted from the above description of operation that when effecting an application of the brakes the selector valve portion determines whether the brake cylinder pressure shall be built up at a rapid rate through passages 80 and 27 or at a restricted rate through the choked portions 70 and 87 of passages 69 and 86, and the position of the selector valve is obtained when releasing the brakes, in accordance with the position of the control valve device in the train.

In the brake operation above described, the usual retaining valve device 5 is carried in a position for permitting a complete venting of fluid from the brake cylinder 51. In cycling on a grade, however, the retaining valve is "turned up" so as to permit the brake cylinder pressure to reduce only to a predetermined degree and then the retaining valve operates to hold this reduced brake cylinder pressure while the brake equipments are being recharged.

In cycling, the initial application of the brakes is effected in the same manner as hereinbefore described, and when it is desired to recharge the brake equipment in order to effect another application of the brakes, the brake pipe 2 is recharged and the valve devices 1 are moved to their release position in which fluid is vented from the brake cylinder 4. The brake cylinder pressure continues to reduce until the predetermined setting of the retaining valve 5 is reached, at which time the retaining valve closes and holds the remaining brake cylinder pressure.

According to my invention, fluid at the pressure in the brake cylinder 4 acts in diaphragm chamber 48 of the inshot suppression valve on account of the brake cylinder connection thereto through passage 83, delay valve chamber 26 and passage and pipe 27. The pressure of fluid acting on the suppression diaphragm 46, deflects said diaphragm and the diaphragm 43 upwardly, causing diaphragm 43 to engage a seat rib 91, as shown in Figs. 3 and 4 of the drawings, in order to close communication from passage 63 to passage 64. The reduced brake cylinder pressure held by the retaining valve device 5 is adapted to maintain said communication closed so as to prevent flow of fluid to the inshot reservoir 6 upon recharging the brake equipment after the initial application, so that when the brakes are further applied upon another reduction in brake pipe pressure, there will be no inshot of fluid to the brake cylinder at the front portion of the train. After the initial application of brakes, the inshot of fluid to the brake cylinder at the front portion of the train is unnecessary, since the brake cylinder piston 53 is already out past the leakage groove 57, due to retained brake cylinder pressure, and such an inshot would merely undesirably augment the brake cylinder pressure at the front portion of the train.

As hereinbefore described, when the brake equipment is fully recharged with fluid under pressure, the control valve piston 7 and slide valves 10 and 11 at the head end of the train are held in the retarded recharge position against the pressure of spring 18 on account of the loading cavity 65 in the seat of the main slide valve 10 being open to the atmosphere through port 66 in the main slide valve and the atmospheric passage 67. This is necessary in order to permit the inshot reservoir to become charged with fluid under pressure, since fluid under pressure is prevented from flowing to the inshot reservoir until the brake cylinder pressure in diaphragm chamber 48 of the suppression portion is reduced to a low degree to permit the diaphragm 43 to move away from the seat rib 91. If the loading cavity were not so employed, then at the time the brake cylinder pressure would become reduced to a low degree, the opposing pressures acting on the piston 7 would be such as to permit spring 18 to shift said piston and the slide valves 10 and 11 to the full release position, in which charging of the inshot reservoir could not occur.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, and a brake cylinder, of a valve device operative upon a reduction in brake pipe pressure to supply fluid under pressure through a passage having a restriction to said brake cylinder and through another passage by-passing said restriction to said brake cylinder for effecting an application of the brakes, said valve device being movable to a release position upon an increase in brake pipe pressure at a predetermined rate for venting fluid under pressure from said brake cylinder to effect a release of the brakes and movable to an inner position upon an increase in brake pipe pressure at a faster rate, a valve having a cut-in position for closing communication through said by-pass passage, and a movable abutment operated by fluid under pressure supplied from said brake cylinder through said valve device when said valve device is moved to its inner position for moving said valve to the cut-in position.

2. In a fluid pressure brake, the combination with a brake pipe, a brake cylinder, and a reservoir charged with fluid under pressure, of a valve device operative upon a reduction in brake pipe pressure to permit an equalization of fluid under pressure from said reservoir into said brake cylinder and to supply fluid under pressure from a source to said brake cylinder to effect an application of the brakes, said valve device being operative upon a rapid rate of increase in brake pipe pressure to establish communication for supplying fluid under pressure to said reservoir and upon a slower rate of increase in brake pipe pressure for closing said communication.

3. In a fluid pressure brake, the combination with a brake pipe, brake cylinder and auxiliary reservoir, of an inshot reservoir and an equalizing valve device operated upon a reduction in brake pipe pressure for supplying fluid from the auxiliary reservoir to the brake cylinder to effect an application of the brakes, said equalizing valve device being movable to an inner release position upon a predetermined rate of increase in brake pipe pressure, in which inner position communication is established for charging said inshot reservoir with fluid under pressure, said equalizing valve device being movable only to normal release position upon an increase in brake pipe pressure at less than said predetermined rate, in which normal release position said inshot reservoir charging communication is closed, and ports controlled by said equalizing valve device for supplying fluid under pressure from said inshot reservoir to the brake cylinder, upon movement of said equalizing valve device to apply the brakes.

4. In a fluid pressure brake, the combination with a brake pipe, a brake cylinder, and auxiliary reservoir, of a valve device operative upon a reduction in brake pipe pressure to supply fluid under pressure from said auxiliary reservoir to said brake cylinder at a restricted rate to effect an application of the brakes and operative upon an increase in brake pipe pressure to supply fluid under pressure to said auxiliary reservoir and to vent fluid under pressure from said brake cylinder to effect a release of the brakes, and a reservoir adapted to be charged with fluid under pressure, said valve device being operative upon a reduction in brake pipe pressure to establish a communication through which fluid is supplied from said reservoir to said brake cylinder at a rapid rate and operative upon a high rate of increase in brake pipe pressure to establish communication through which fluid under pressure is supplied to said reservoir and upon a lower rate of increase in brake pipe pressure to close said communication.

5. In a fluid pressure brake, the combination with a brake pipe, an auxiliary reservoir, and a brake cylinder, of a brake controlling valve device movable to application position for supplying fluid under pressure from said auxiliary reservoir to said brake cylinder to effect an application of the brakes, means for reducing the rate of flow of fluid from said auxiliary reservoir to said brake cylinder to a slow rate, a reservoir of limited volume at one time charged with fluid under pressure, said valve device being operative in application position to establish communication through which fluid under pressure is rapidly supplied from said reservoir to said brake cylinder to build up a predetermined low pressure therein, said valve device being operated by a high rate of increase in brake pipe pressure at the front end of a train to a position for venting fluid under pressure from said brake cylinder to effect a release of the brakes, and for establishing a communication through which fluid is supplied to said reducing means for rendering it active and another communication through which said reservoir is charged with fluid under pressure, said valve device being operated by a lower rate of increase in brake pipe pressure at the rear end of the train to a position for venting fluid under pressure from said brake cylinder to effect a release of the brakes, and for establishing a communication through which fluid is supplied to said reducing means for rendering it inactive, and for closing the communication to said reservoir.

6. In a fluid pressure brake, the combination with a brake pipe, a brake cylinder, and a reservoir at one time charged with fluid under pressure of valve means operative upon a reduction in brake pipe pressure for effecting the equalization of fluid under pressure from said reservoir into said brake cylinder, and operative upon an increase in brake pipe pressure to establish a communication through which fluid under pressure is supplied to said reservoir, and means operated by fluid under pressure when said valve means is operated by an increase in brake pipe pressure for closing said communication.

7. In a fluid pressure brake, the combination with a brake pipe, a brake cylinder, and a reservoir at one time charged with fluid under pressure, of valve means operative upon a reduction in brake pipe pressure for effecting the equalization of fluid under pressure from said reservoir into said brake cylinder, and operative upon an increase in brake pipe pressure to establish a communication through which fluid under pressure is supplied to said reservoir, and means operated by the pressure of fluid in said brake cylinder for closing said communication.

8. In a fluid pressure brake, the combination with a brake pipe, a brake cylinder, and a reservoir at one time charged with fluid under pressure, of valve means operative upon a reduction in brake pipe pressure for effecting the equalization of fluid under pressure from said reservoir into said brake cylinder, and operative upon an increase in brake pipe pressure to establish a communication through which fluid under pressure is supplied to said reservoir, and a valve device subject to the opposing pressures of the brake cylinder and of fluid supplied to said communication by said valve means for closing said communication.

9. In a fluid pressure brake, the combination with a brake pipe, a brake cylinder, and a reservoir at one time charged with fluid under pressure, of valve means operative upon a reduction in brake pipe pressure for effecting the equalization of fluid under pressure from said reservoir into said brake cylinder, and operative upon an increase in brake pipe pressure to establish a communication through which fluid under pressure is supplied to said reservoir, and a valve device for closing said communication and comprising a pair of connected abutments having differential areas and adapted to be operated to the closing position by the pressure of fluid in said brake cylinder.

10. In a fluid pressure brake, the combination with a brake pipe, a brake cylinder, an auxiliary reservoir, and a brake control valve device operative upon a reduction in brake pipe pressure to supply fluid under pressure from said auxiliary reservoir to said brake cylinder for effecting an application of the brakes, and operative upon an increase in brake pipe pressure to vent fluid under pressure from said brake cylinder to effect a release of the brakes, of a reservoir, said valve device being operative upon an increase in brake pipe pressure to supply fluid under pressure to said reservoir and operative upon a reduction in brake pipe pressure to supply fluid from said reservoir to said brake cylinder, and valve means operative by the pressure of fluid from the brake cylinder for cutting off the supply of fluid to said reservoir when said valve device is operated by an increase in brake pipe pressure.

11. In a fluid pressure brake, the combination with a brake pipe, a brake cylinder, an auxiliary reservoir and a brake control valve device operative upon a reduction in brake pipe pressure to supply fluid under pressure from said auxiliary reservoir to said brake cylinder for effecting an application of the brakes, and operative upon an increase in brake pipe pressure to vent fluid under pressure from said brake cylinder to effect a release of the brakes, of a reservoir, said valve device being operative upon an increase in brake pipe pressure to supply fluid under pressure to said reservoir and operative upon a reduction in brake pipe pressure to supply fluid from said reservoir to said brake cylinder, and valve means operative by the pressure of fluid from the brake cylinder for holding back the supply of fluid to said reservoir, when said valve device is operated by an increase in brake pipe pressure, until the pressure of fluid in the brake cylinder has been reduced to a predetermined degree.

12. In a fluid pressure brake, the combination with a brake pipe, brake cylinder, and auxiliary reservoir, of an inshot reservoir, an equalizing valve device operated upon a reduction in brake pipe pressure for supplying fluid from the auxiliary reservoir to the brake cylinder, said equalizing valve device being adapted in one position to supply fluid under pressure to said inshot reservoir, and in application position to supply fluid from said inshot reservoir to the brake cylinder, and valve means normally establishing communication through which fluid is supplied from the inshot reservoir to the brake cylinder and operated by pressure retained in the brake cylinder for cutting off said communication.

13. In a fluid pressure brake, the combination with a brake pipe, brake cylinder, and auxiliary reservoir, of an inshot reservoir, an equalizing valve device operated upon a reduction in brake pipe pressure for supplying fluid from the auxiliary reservoir to the brake cylinder, said equalizing valve device being adapted in one position to supply fluid under pressure to said inshot reservoir, and in application position to supply fluid from said inshot reservoir to the brake cylinder, means operative to retain fluid under pressure in the brake cylinder, and valve means normally establishing communication through which fluid is supplied from the inshot reservoir to the brake cylinder and operated by pressure retained in the brake cylinder by said means for cutting off said communication.

14. In a fluid pressure brake, the combination with a brake cylinder, a brake pipe, an auxiliary reservoir, another reservoir and a choke, of a brake controlling valve device operative upon a reduction in brake pipe pressure to establish communication from said auxiliary reservoir to said brake cylinder through said choke and operative to establish unrestricted communication from the other reservoir to said brake cylinder, and valve means operated by a predetermined increase in brake cylinder pressure for opening a by-pass around said choke.

15. In a fluid pressure brake, the combination with a brake cylinder, a brake pipe, an auxiliary reservoir, and another reservoir, of a brake controlling valve device operative upon a reduction in brake pipe pressure to establish communication from said reservoirs to said brake cylinder, a choke in the communication from said auxiliary reservoir to said brake cylinder, and valve means operated by a predetermined increase in brake cylinder pressure for opening a by-pass around said choke and for closing communication from said other reservoir to said brake cylinder.

16. In a fluid pressure brake, the combination with a brake cylinder, a brake pipe, an auxiliary reservoir, and another reservoir, of a brake controlling valve device operative upon a reduction in brake pipe pressure to establish communication from said reservoirs to said brake cylinder, a choke in the communication from said auxiliary reservoir to said brake cylinder, and valve means operated by a predetermined increase in brake cylinder pressure for closing communication from said other reservoir to said brake cylinder.

17. In a fluid pressure brake, the combination with a brake cylinder, a brake pipe, an auxiliary reservoir, and another reservoir, of a brake controlling valve device operative upon a reduction in brake pipe pressure to establish communication from said reservoirs to said brake cylinder, a choke in the communication from said auxiliary reservoir to said brake cylinder, and valve means comprising an abutment operated by a predetermined increase in brake cylinder pressure for closing communication from said other reservoir to said brake cylinder.

18. In a fluid pressure brake, the combination with a brake cylinder, a brake pipe, an auxiliary reservoir, and another reservoir, of a brake controlling valve device operative upon a reduction in brake pipe pressure to establish communication from said reservoirs to said brake cylinder, a choke in the communication from said auxiliary reservoir to said brake cylinder, and valve means comprising two movable connected abutments operated by a predetermined increase in brake cylinder pressure for closing communication from said other reservoir to said brake cylinder.

19. In a fluid pressure brake, the combination with a brake cylinder, a brake pipe, an auxiliary reservoir, and another reservoir, of a brake controlling valve device operative upon a reduction in brake pipe pressure to establish communication from said reservoirs to said brake cylinder, a choke in the communication from said auxiliary reservoir to said brake cylinder, and valve means comprising two movable connected abutments having different areas and operated by a predetermined increase in brake cylinder pressure for closing communication from said other reservoir to said brake cylinder.

20. In a fluid pressure brake, the combination with a brake cylinder, a brake pipe, an auxiliary reservoir, and another reservoir, of a brake controlling valve device operative upon a reduction in brake pipe pressure to establish communication from said reservoirs to said brake cylinder, and operative upon an increase in brake pipe pressure at a predetermined rate to supply fluid under pressure from said brake pipe only to said auxiliary reservoir and at a faster rate to supply fluid under pressure from said brake pipe to both of said reservoirs.

21. In a fluid pressure brake, the combination with a brake cylinder, a brake pipe, an auxiliary reservoir, and another reservoir, of a brake controlling valve device operative upon a reduction in brake pipe pressure to establish communication from said reservoirs to said brake cylinder, and operative upon an increase in brake pipe pressure at a predetermined rate to supply fluid under pressure from said brake pipe only to said auxiliary reservoir and at a faster rate to supply fluid under pressure from said brake pipe to both of said reservoirs, and valve means operated in accordance with the rate of increase in brake pipe pressure for controlling an unrestricted communication through which fluid under pressure is adapted to be supplied from the brake controlling valve device to said brake cylinder.

22. In a fluid pressure brake, the combination with a brake cylinder, a brake pipe, an auxiliary reservoir, and another reservoir, of a brake controlling valve device operative upon a reduction in brake pipe pressure to establish communication from said reservoirs to said brake cylinder, and operative upon an increase in brake pipe pressure at a predetermined rate to supply fluid under pressure from said brake pipe only to said auxiliary reservoir and at a faster rate to supply fluid under pressure from said brake pipe to both of said reservoirs and irrespective of the rate of increase in brake pipe pressure to release fluid under pressure from said brake cylinder, and valve means operated by brake cylinder pressure in releasing the brakes for controlling an unrestricted communication from said brake controlling valve device to said brake cylinder.

CLYDE C. FARMER.